United States Patent [19]

Satoh et al.

[11] 4,322,152
[45] Mar. 30, 1982

[54] ELECTROMAGNETIC RELEASE MECHANISM

[75] Inventors: Mituo Satoh, Tsurugashima; Koji Sato, Shiki; Toru Kando, Tokyo, all of Japan

[73] Assignee: Asahi Kogaku Kogyo Kabushiki Kaisha, Tokyo, Japan

[21] Appl. No.: 227,904

[22] Filed: Jan. 23, 1981

[30] Foreign Application Priority Data

Feb. 12, 1980 [JP] Japan .............................. 55/16141[U]

[51] Int. Cl.³ ............................................. G03B 17/42
[52] U.S. Cl. .................................... 354/204; 354/234; 354/266; 335/219; 335/238
[58] Field of Search .................. 354/204–206, 354/234, 235, 266–269, 212–216; 335/219, 238, 270, 229, 230; 242/71–71.5

[56] References Cited

U.S. PATENT DOCUMENTS 4,133,608 1/1979 Tanaka ................................ 354/235
4,160,591 7/1979 Suzuki et al. ........................ 354/235

Primary Examiner—L. T. Hix
Assistant Examiner—William B. Perkey
Attorney, Agent, or Firm—Sughrue, Mion, Zinn, Macpeak & Seas

[57] ABSTRACT

An electromagnetic release mechanism for a camera in which a release member is returned to an energized and locked position through a spring which is energized and deenergized in response to rotation of a cam which is rotated upon performing a film winding operation. A rotatable release locking member has a forked end in which is engaged a first end of a release member and a cut in which an end of a slidable release drive member is lockably engaged. A movable member is mounted on the other end of the release member at a position to be attracted by an electromagnet the force of which is reduced by a coil wound thereon when a current is passed through the coil upon the start of a release operation. A spring joins the release member to one end of an arm which is rotated at its center and which has its other end riding upon the cam surface. With this construction, it is unnecessary to provide a separate mechanism for forcibly returning the release member after a release operation has been accomplished.

5 Claims, 3 Drawing Figures

ELECTROMAGNETIC RELEASE MECHANISM

BACKGROUND OF THE INVENTION

Recently, electromagnetic release mechanisms have been extensively employed in cameras. In general, an electromagnetic release mechanism employs an electromagnet composed of a permanent magnet and a coil magnetically coupled to the permanent magnet wherein the magnetic flux of the former opposes that of the latter. The external magnetic field and hence the force of attraction is reduced by applying current to the coil.

In the case where a camera release member is operated by using such an electromagnet, it is necessary to forcibly return the release member after the release operation is accomplished which is considered disadvantageous.

SUMMARY OF THE INVENTION

In view of the foregoing, the invention provides an electromagnetic release mechanism with which it is possible to return the release member by the utilization of the timing of energizing and deenergizing a spring which causes the release member to move away from an electromagnet and the force which is applied to a release locking member engaged with the release member without separately providing a member which forcibly returns the release member.

More specifically, the invention provides an electromagnetic release mechanism including an electromagnet having a permanent magnet and a coil wound on a yoke wherein the force of attraction produced by the permanent magnet is reduced in response to current flowing in the coil. A rotatable release locking member is provided having a forked end and a cut with the cut positioned to lock a release drive member. A release member, which is rotatably mounted, has a movable member at one end thereof at a position to be attracted by the electromagnet and having the other end retained in the forked end of the release locking member. A first spring urges the release locking member to turn the release member to engage the movable member with the electromagnet. A second spring is provided having a first end connected to the release member so as to urge the release member to turn the release locking member in a direction so as to release the release drive member. A rotatable arm has a first end connected to a second end of the second spring and a second end operatively coupled to a cam which rotates in response to a film winding operation wherein the cam, upon rotation, energizes the second spring at a first rotational position and deenergizes the second spring at a second rotational position thereof. Specifically, at the beginning of a film winding operation, the second spring is deenergized to permit the movable member to engage with the permanent magnet and the release drive member to be locked by the cut formed in the release locking member.

DESCRIPTION OF THE PREFERRED EMBODIMENTS

A preferred embodiment of the invention will be described with reference to the accompanying drawings.

Figure 1:
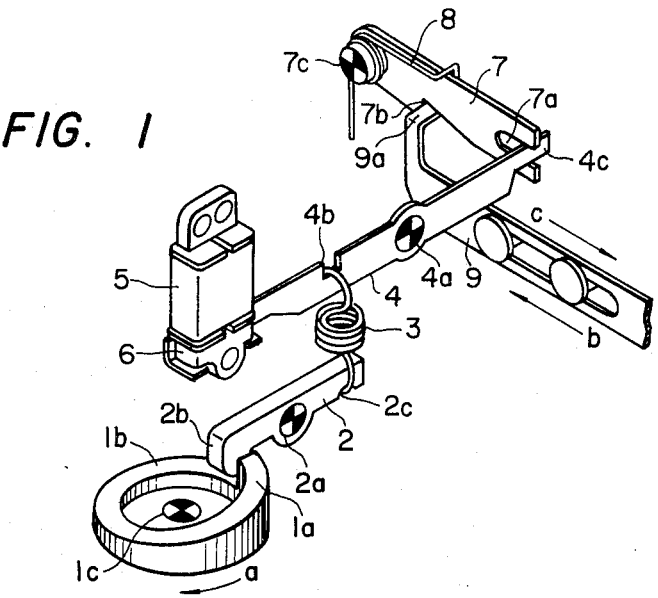
FIG. 1 is a perspective view of a preferred embodiment of an electromagnetic release mechanism according to the invention.

As shown in FIG. 1, a cam 1 is rotatable in the direction of the arrow a around its rotation center 1c. In this structure, the cam 1 undergoes one revolution in association with each film winding operation. A release locking member 7, which is rotatable around a shaft 7c, is biased downwardly by a spring 8. A release drive member 9 has an end portion 9a which is locked by a cut 7b formed in the release locking member 7. The release drive member 9 is maintained forced in the direction of the arrow b during a film winding operation. When the end portion 9a is disengaged from the cut 7b of the release locking member 7 as the release locking member 7 is turned upwardly, the release drive member 9 is run in the direction of the arrow b to perform the release operation. Upon completion of the release operation, the release locking member 7 is returned in the direction of the arrow c to the original locking position. The above-described operation is generally employed in cameras.

Figure 2:
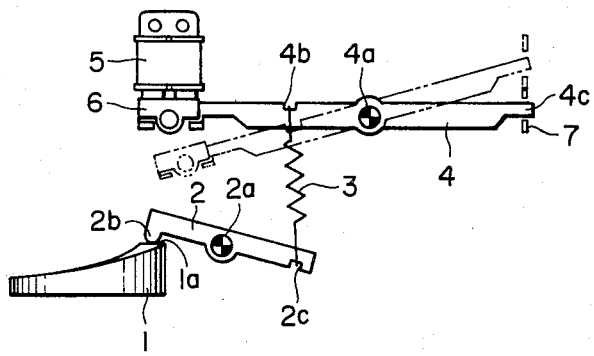
FIGS. 2 and 3 are side views of the electromagnetic release mechanism of FIG. 1 for a description of the operation thereof.
Figure 3:
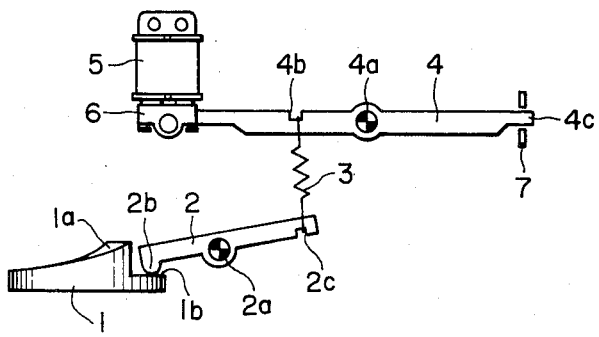

FIG. 1 shows the state in which the release operation has been completed and the film winding operation is started. When the film winding operation is carried out to a certain extent, the state shown in FIG. 2 is reached. In this state, the slide portion 2b of an arm 2 having a rotation center 2a rides on the highest portion 1a of the cam surface of the cam 1 so that a spring 3, having one end connected to a cut 2c formed in the arm 2 and the other to a cut 4b formed in a release member 4, is energized. The release member 4 has a rotation center 4a in a middle portion thereof and has a movable member 6 at one end. The movable member 6 is attracted by the magnetic flux of a permanent magnet of an electromagnet 5.

Upon depression of the release button, current flows in the coil of the electromagnet 5 so that the force of attraction of the electromagnet 5 is reduced. As a result, the release member 4 is turned by the elastic force of the spring 3 which has been energized as indicated by the two-dot chain line in FIG. 2. Therefore, the release locking member 7, a forked end 7a of which is engaged with one end portion 4c of the release member 4, is turned upwardly to start the release operation. The force of the energized spring 3 must be large enough to overcome the force of the spring 8 which returns the release locking member 7. Upon completion of the release operation, the release drive member 9 returns to its original locking position in which position the release locking member 7 is urged downwardly by the force of the spring 8 but it cannot actually move as the force of the spring 8 is counteracted by the spring 3.

If, under this condition, the next film winding operation is started, in the first stage of the operation, the cam 1 is slightly turned so that the slide portion 2b of the arm 2 rides on the lowest portion 1b of the cam surface of the cam 1. However, during this operation, the spring 3 is completely deenergized and therefore the spring 8 acts to move the release locking lever 7 downwardly again. As a result, the release drive member 9 is locked by the release locking lever 7. No current is then flowing in the coil of the electromagnet 5. Accordingly, the movable member 6 provided at the end portion of the release member 4 is attracted and held by the magnetic field of the permanent magnet of the electromagnet 5. In the next stage of the film winding operation, the spring 3 is gradually energized so that the release drive member 9 is forced to move in the direction of the arrow b. Thus, the state shown in FIG. 2 is reached.

In the electromagnetic release mechanism thus constructed according to the invention, it is unnecessary to provide a heretofore required mechanism for forcibly returning the release member 4. Thus, the release mechanism of the invention is advantageous in requiring fewer parts and being easier to assemble than the prior art mechanism.

What is claimed is:

1. An electromagnetic release mechanism comprising:
    an electromagnet having a permanent magnet and a coil wound on a yoke, a force of attraction of said permanent magnet being reduced in response to current flowing in said coil;
    a rotatable release locking member having a forked end and a cut, said cut being positioned to lock a release drive member;
    a release member having a movable member at one end at a position to be attracted by said electromagnet and having the other end retained in said forked end of said release locking member;
    a first spring for urging said release locking member to turn said release member to engage said movable member with said electromagnet;
    a second spring having a first end connected to said release member, said second spring urging said release member to turn said release locking member in a direction to release said release drive member; and
    a rotatable arm having a first end connected to a second end of said second spring and a second end operatively coupled to a cam which rotates in response to a film winding operation, said cam energizing said second spring at a first rotational position and deenergizing said second spring at a second rotational position.

2. The electromagnetic release mechanism of claim 1 further comprising said release drive member, said release drive member being slidably mounted parallel to said release locking member and said release drive member having an end portion engagable with said cut of said rotatable release locking member.

3. The electromagnetic release mechanism of claim 2 wherein said release member and said arm are mounted to rotate in plane substantially perpendicular to a plane in which said release locking member is rotatable.

4. The electromagnetic release mechanism of claim 3 wherein the force produced by said second spring is large enough to overcome the force produced by said first spring.

5. The electromagnetic release mechanism of claim 1 wherein said second end of said arm rides upon a lower portion of said cam to deenergize said second spring at the beginning of a film winding operation.

* * * * *